United States Patent
Lee

(10) Patent No.: US 6,909,076 B2
(45) Date of Patent: Jun. 21, 2005

(54) MICROWAVE OVEN AND CONTROL METHOD THEREOF

(75) Inventor: Sung-Ho Lee, Hwasung (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 203 days.

(21) Appl. No.: 10/246,692

(22) Filed: Sep. 19, 2002

(65) Prior Publication Data

US 2003/0218008 A1 Nov. 27, 2003

(30) Foreign Application Priority Data

May 27, 2002 (KR) ......................................... 2002-29338

(51) Int. Cl.[7] ................................................. H05B 6/66
(52) U.S. Cl. ...................................... 219/702; 219/718
(58) Field of Search .............................. 219/702, 703, 219/715, 716, 718–720

(56) References Cited

U.S. PATENT DOCUMENTS

| | | | | |
|---|---|---|---|---|
| 4,613,739 A | * | 9/1986 | Richards | 219/718 |
| 4,724,291 A | * | 2/1988 | Inumada | 219/718 |
| 4,990,733 A | | 2/1991 | Joelsson et al. | |
| 5,045,658 A | * | 9/1991 | Smith | 219/716 |
| 5,149,929 A | * | 9/1992 | Minakawa et al. | 219/716 |
| 5,436,433 A | * | 7/1995 | Kim et al. | 219/703 |

* cited by examiner

Primary Examiner—Teresa J. Walberg
(74) Attorney, Agent, or Firm—Staas & Halsey LLP

(57) ABSTRACT

A microwave oven and control method thereof in which the microwave oven has a magnetron initially driven for a preset period of time to generating an output of at least 20% of a rated output of the magnetron when a cooking mode requiring a low output of less than 20% of the rated output of the magnetron is selected. Further, the magnetron performs the cooking mode by generating the low output of less than 20% of the rated output of the magnetron after the initial driving is completed. In this case, the cooking mode requiring the low output can be a thawing mode, a warming mode, etc. Further, the microwave oven of the present invention is an inverter-type microwave oven.

17 Claims, 5 Drawing Sheets

MICROWAVE OVEN AND CONTROL METHOD THEREOF

CROSS-REFERENCE TO RELATED APPLICATIONS

This application claims the benefit of Korean Application No. 2002-29338, filed May 27, 2002, in the Korean Intellectual Property Office, the disclosure of which is incorporated herein by reference.

BACKGROUND OF THE INVENTION

1. Field of the Invention

The present invention relates generally to microwave ovens, and more particularly, to an inverter type microwave oven that drives a magnetron of the microwave oven in an inverter manner.

2. Description of the Related Art

Generally, microwave ovens are used for thawing foods, such as refrigerated meat, as well as for boiling foods. For frozen dinners in a frozen state, thawing and boiling of foods must be executed sequentially. Further, the microwave ovens are used for warming previously cooked food, such as milk, to a suitable temperature.

In this way, the microwave ovens are frequently used for cooking (thawing or warming) foods using a relatively low output of a magnetron as well as a high output thereof. In thawing, food may be fully boiled under an excessively high output of the magnetron. Further, milk warmed to a suitable temperature is frequently consumed to help individuals suffering from insomnia. In this case, the boiling of milk must be prevented so as to avoid destroying nutritive substances of the milk. However, if the milk is warmed under an excessively high output of the magnetron, the temperature of milk can be increased to the boiling point. Further, if a cooking time is reduced so as to prevent milk from boiling, milk in a lower portion of a container may not be sufficiently warmed.

Therefore, when a microwave oven is used, the output of the magnetron must be sufficiently reduced according to the use of the microwave. In a conventional inverter type microwave oven, the magnetron cannot be used at an output less than 20% of a maximum output of the magnetron. Due to limits of an oscillation voltage of the magnetron and a filament current, which are 3600V and 8.5 to 12 A, respectively, if a duty ratio of a pulse width modulated signal of an inverter is equal to or less than 20% of the maximum output of the magnetron, a secondary side output voltage of a high voltage transformer, which supplies a high voltage to the magnetron, is not sufficient for emission of thermions to occur in the filament. If thermion emissions do not occur, the magnetron cannot oscillate, thus preventing RF signals from being generated. Accordingly, a magnetron with an output at less than 20% of the maximum output of the magnetron cannot be used for cooking.

FIG. 1 is a view showing a relationship between an operating voltage of a magnetron and a filament current in the conventional inverter-type microwave oven. As shown in FIG. 1, in order for the filament current of the inverter type microwave oven to reach 8.5 A to 12 A, an operating voltage must be equal to or greater than 3600V. Thus, when the operating voltage is equal to or greater than 3600V, the filament current reaches 8.5 A to 12 A, and thermion emissions occur, thus enabling the magnetron to oscillate.

FIG. 2 is a view showing a duty ratio of a pulse width modulated signal of an inverter used in the conventional inverter type microwave oven. As shown in FIG. 2, the duty ratio of the pulse width modulated signal of the inverter must be equal to or greater than at least 20% of the maximum output so as to supply enough operating voltage and filament current to allow the magnetron to oscillate.

As described above, since the duty ratio of the pulse width modulated signal of the inverter controlling the output of the magnetron is limited to a range equal to or greater than 20% of the maximum output, an excessively high output of the magnetron is generated in cooking modes, such as thawing and warming modes, such that optimal cooking conditions cannot be realized.

SUMMARY OF THE INVENTION

Accordingly, a microwave oven and control method thereof in which optimal cooking conditions in cooking modes, such as thawing and warming modes, by enabling a magnetron of the microwave oven to generate a low output less than 20% of a rated output are provided.

In order to accomplish the above and other objects, a microwave oven, comprising a magnetron initially driven for a preset period of time to generate an output of at least 20% of a rated output of the magnetron when a cooking mode, which requires a low output of less than 20% of the rated output of the magnetron is selected, and performing the cooking mode by generating the relatively low output of less than 20% of the rated output of the magnetron after the initial driving of the magnetron is completed.

The cooking mode requiring the low output may be one of a thawing mode and a warming mode. Further, the microwave oven is an inverter-type microwave oven, in which an inverter can generate a pulse width modulated signal with a duty ratio less than 20% to limit an output of the magnetron to be less than 20% of a rated output of the magnetron, thus enabling cooking operations in specific cooking modes, such as thawing and warming modes, to be optimally performed.

Additional objects and advantages of the invention will be set forth in part in the description which follows and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
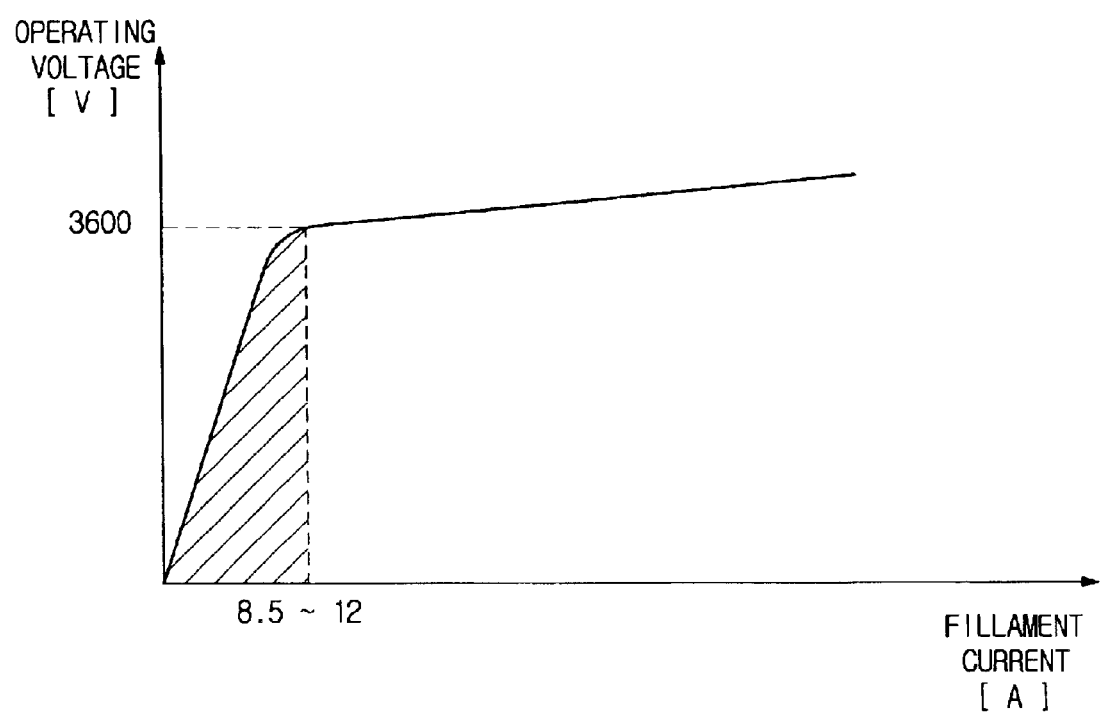
FIG. 1 is a view showing a relationship between an operating voltage of a magnetron and a filament current in a conventional inverter-type microwave oven.
Figure 2:
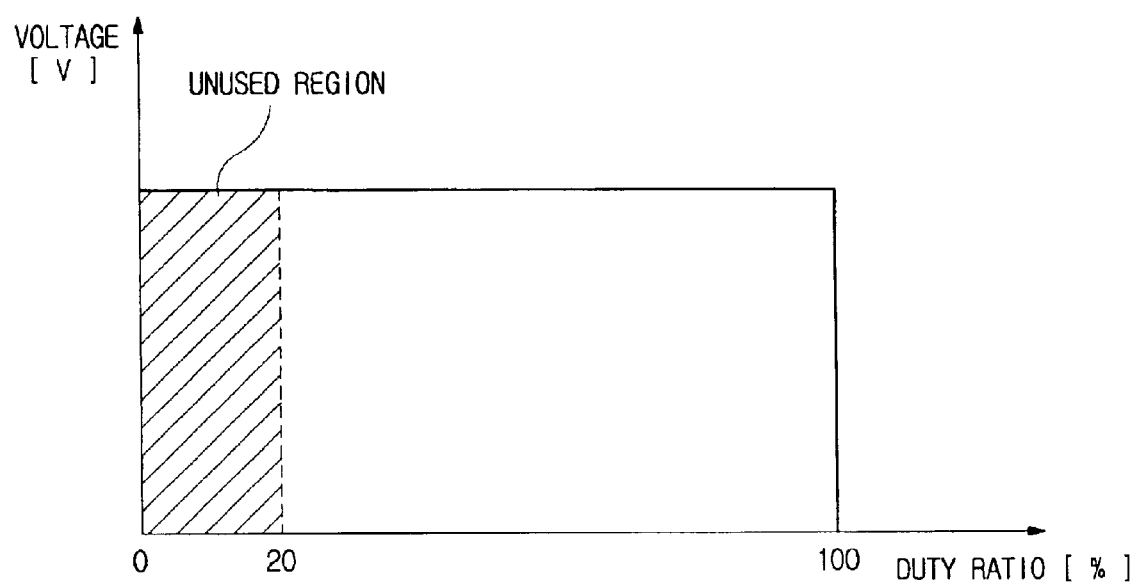
FIG. 2 is a view showing a duty ratio of a pulse width modulated signal of an inverter used in the conventional inverter-type microwave oven.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
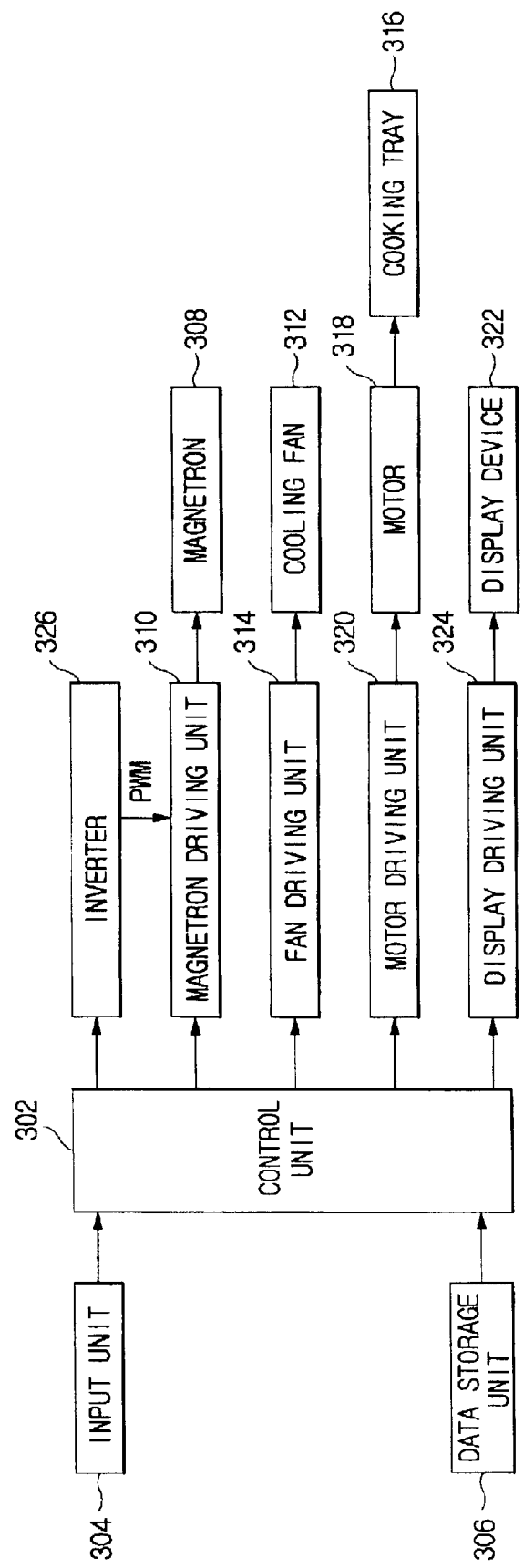
FIG. 3 is a block diagram of a control apparatus of a microwave oven according to an embodiment of the present invention.

Hereinafter, embodiments of a microwave oven and control method thereof according to the present invention will be described in detail with reference to FIGS. 3 to 5. FIG. 3 is a block diagram of a control apparatus of a microwave oven according to an embodiment of the present invention. As shown in FIG. 3, a control unit 302 controls an entire operation of the microwave oven. An input unit 304 is electrically connected to the control unit 302 to enable operation instructions to be inputted by a user. The control unit 302 is electrically connected to a data storage unit 306.

Further, the control unit 302 is electrically connected to a magnetron driving unit 310 to drive a magnetron 308, a fan driving unit 314 to drive a cooling fan 312, a motor driving unit 320 to drive a motor 318 to rotate a cooking tray 316, and a display driving unit 324 to drive a display device 322.

When the microwave oven starts to operate after food is put on the cooking tray 316, the control unit 302 outputs a control signal determining a duty ratio of a pulse width modulated signal to an inverter 326. The inverter 326 outputs a pulse width modulated signal PWM of a duty ratio corresponding to the control signal to the magnetron driving unit 310. The magnetron 308 generates an output of an intensity corresponding to the duty ratio of the pulse width modulated signal PWM. As the magnetron 308 is driven, microwaves of very high frequencies are generated. The microwaves irradiate the food within a cooking chamber (not shown), thus cooking the food.

Figure 4:
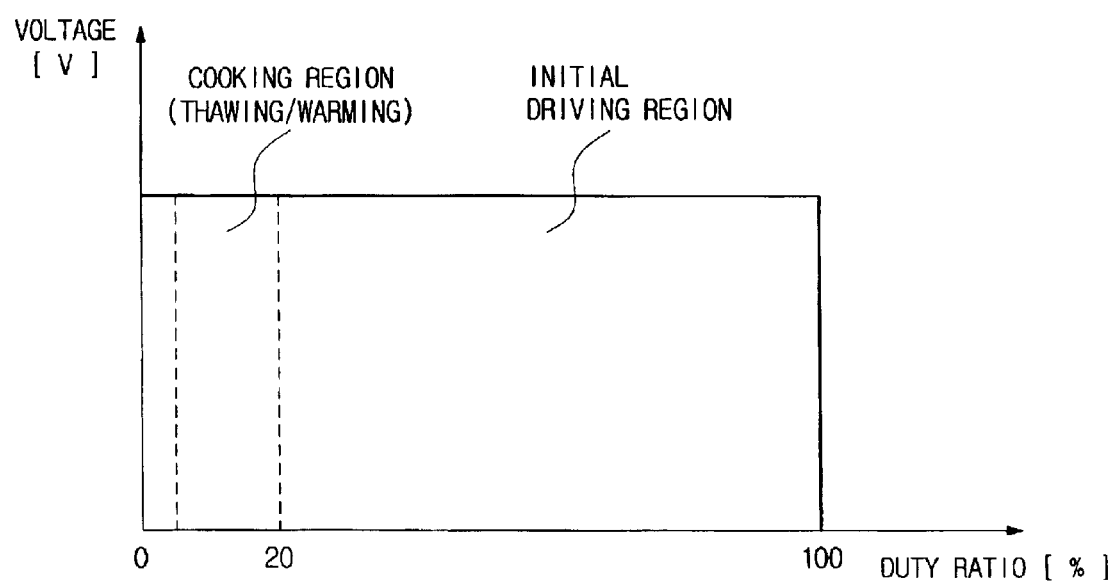
FIG. 4 is a view showing a duty ratio of a pulse width modulated signal of an inverter used in the inverter-type microwave oven of the embodiment of the present invention.

FIG. 4 is a view showing the duty ratio of the pulse width modulated signal of the inverter used in the inverter-type microwave oven according to the embodiment of the present invention. As shown in FIG. 4, when the magnetron is driven for an initial time, a pulse width modulated signal having a duty ratio of 20% to 100% is used. However, in cooking modes requiring a low output of the magnetron, such as thawing and warming modes, a pulse width modulated signal having a duty ratio of 5% to 20% is used. Especially in a thawing mode, a pulse width modulated signal having a duty ratio of around 5% is used, such that the food is only thawed without boiling the food. Further, if necessary, a pulse width modulated signal having a duty ratio less than 5% is used, thus enabling a cooking mode requiring a very low output of the magnetron to be realized.

Figure 5:
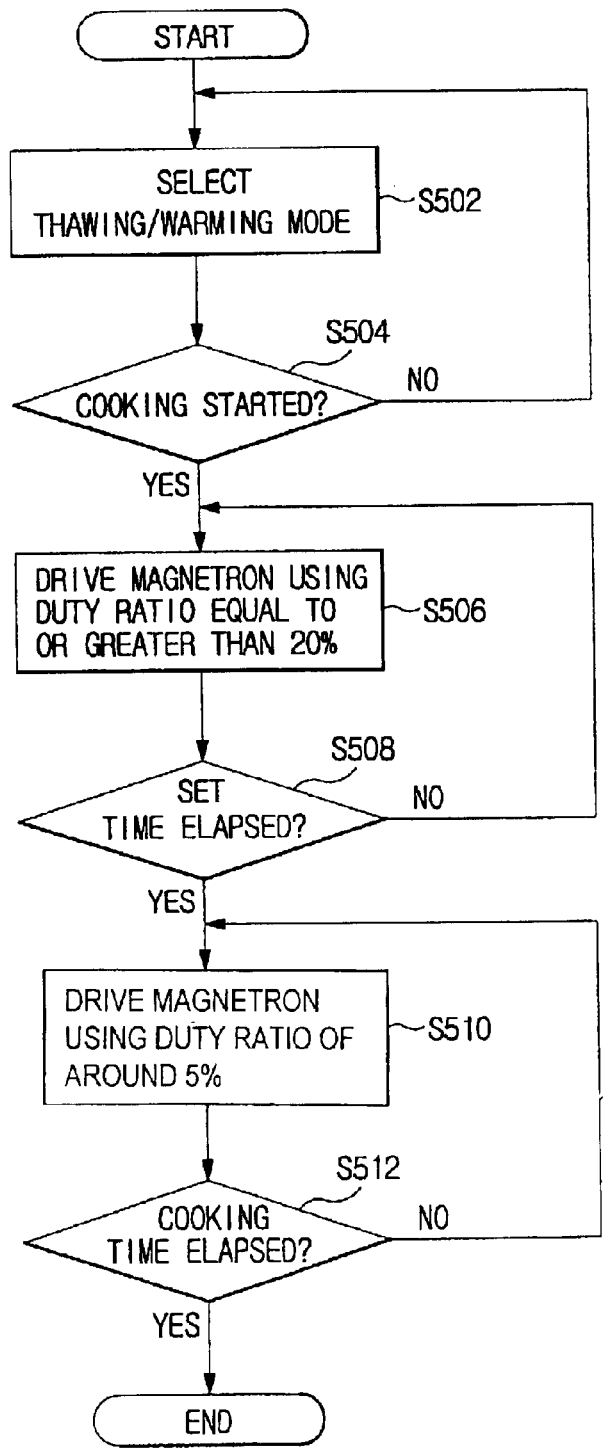
FIG. 5 is a flowchart of a control method of the inverter-type microwave oven according to the embodiment of the present invention.

FIG. 5 is a flowchart of a control method of the inverter type microwave oven according to the embodiment of the present invention. As shown in FIG. 5, a user selects thawing/warming modes at S502. When the user manipulates a cooking start button, the microwave oven starts cooking at S504. In this case, a cooking time preset according to an amount and kind of food is automatically set. However, before a real thawing mode starts, an initial driving mode of the magnetron is performed for almost 5 seconds at S506. At initial driving operation of the magnetron, a pulse width modulated signal having a duty ratio equal to or greater than 20% is used to drive the magnetron at S506, thereby enabling the magnetron to oscillate sufficiently by heating up the magnetron. In this case, if the duty ratio of the pulse width modulated signal used to drive the magnetron is set to be close to 100%, an initial driving time can be shortened. After the magnetron driving S506 is performed for a preset period of time at S508, the magnetron is driven using a pulse width modulated signal having a duty ratio of around 5% at S510, such that thawing/warming operations of the food can be executed. After the preset cooking time has elapsed at S512, the cooking mode is finished.

As described above, a microwave oven and control method thereof are provided, which can provide optimal cooking conditions in cooking modes, such as thawing and warming modes, by enabling a magnetron of the microwave oven to generate a low output, which is less than 20% of a rated output of the magnetron.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A microwave oven, comprising:

a magnetron initially driven for a preset period of time to generate an output of at least 20% of a rated output of the magnetron when a cooking mode, which requires a low output of less than 20% of the rated output of the magnetron is selected, and performing the cooking mode by generating the low output of less than 20% of the rated output of the magnetron after the initial driving of the magnetron is completed, wherein the microwave oven is an inverter-type microwave oven in which an output of the magnetron is controlled by an inverter, and wherein the output of the magnetron is determined according to a duty ratio of a pulse width modulated signal output from the inverter.

2. The microwave oven according to claim 1, wherein the cooking mode requiring the low output is one of a thawing mode and a warming mode.

3. The microwave oven according to claim 1, wherein:

the inverter generates the pulse width modulated signal having a duty ratio of at least 20% to drive the magnetron while the magnetron is initially driven; and the inverter generates the pulse width modulated signal having a duty ratio of less than 20% to drive the magnetron while the cooking mode is performed.

4. A method of controlling a microwave oven, the microwave oven having a magnetron, comprising:

initially driving the magnetron for a preset period of time by allowing the magnetron to generate an output of at least 20% of a rated output of the magnetron when a cooking mode requiring a low output of less than 20% of the rated output of the magnetron is selected; and performing the cooking mode by generating the low output less than 20% of the rated output of the magnetron after the initial driving is completed, wherein the microwave oven is an inverter-type microwave oven in which an output of the magnetron is controlled by an inverter, and wherein the output of the magnetron is determined according to a duty ratio of a pulse width modulated signal output from the inverter.

5. The microwave oven control method according to claim 4, wherein the cooking mode requiring the low output is one of a thawing mode and a warming mode.

6. The microwave oven control method according to claim 4, wherein:

the inverter generates the pulse width modulated signal having a duty ratio of at least 20% to drive the magnetron while the magnetron is initially driven; and the inverter generates the pulse width modulated signal having a duty ratio less than 20% to drive the magnetron while the cooking mode is performed.

7. A microwave oven, comprising:

a magnetron; and an inverter controlling a duty ratio of the magnetron, the magnetron being initially controlled to generate an output in a range of about 20% to 100% of a maximum output of the magnetron, thereafter the magnetron being controlled to generate an output in a range of less than 20% of the maximum output of the magnetron, thereby enabling a cooking mode at an output of the magnetron of less than 20% of the maximum output of the magnetron.

8. The microwave oven according to claim 7, wherein the cooking mode is a thawing mode and the output of the magnetron is around 5% of the maximum output of the magnetron.

9. The microwave oven according to claim 7, wherein the cooking mode is a warming mode and the output of the magnetron is in a range of about 5% to 20% of the maximum output of the magnetron.

10. The microwave oven according to claim 7, wherein the cooking mode is one of a thawing mode and a warming mode.

11. The microwave oven according to claim 7, wherein:

the output of the magnetron is determined according to a duty ratio of a pulse width modulated signal outputted from the inverter.

12. A method of controlling a microwave oven, the microwave oven having a magnetron, comprising:

selecting a cooking mode with an output of less than 20% of a maximum output of the magnetron;

first controlling the magnetron to generate an output of at least 20% of a maximum output of the magnetron for a preset period of time; and second controlling the magnetron to generate an output of less than 20% of the maximum output of the magnetron after said first controlling, thereby enabling the cooking mode with the output of less than 20% of the maximum output of the magnetron, wherein said first controlling of the magnetron and said second controlling of the magnetron include generating the output of the magnetron by outputting a pulse width modulated signal, with the output of the magnetron being in accordance with a duty ratio of the pulse width modulated signal.

13. The microwave oven control method according to claim 12, wherein the cooking mode comprise one of a thawing mode and a warming mode.

14. A microwave oven, comprising:

a magnetron initially driven for a predetermined period at an output level sufficient to produce RF signals, thereafter driving the magnetron at a reduced level, which would not have produced an RF signal initially, but which is sufficient to produce the RF signals after the predetermined period.

15. The microwave oven according to claim 14, further comprising:

an inverter generating a signal to control the output level of the magnetron according to a duty ratio of the generated signal.

16. A method of controlling a microwave oven, comprising:

initially driving a magnetron for a predetermined period at an output level sufficient to produce RF signals; and thereafter driving the magnetron at a reduced level, which would not have produced an RF signal initially, but which is sufficient to produce the RF signals after the predetermined period.

17. The microwave oven according to claim 16, further comprising:

generating a signal to control the output level of the magnetron according to a duty ratio of the generated signal.

* * * * *